(12) United States Patent
Bruno et al.

(10) Patent No.: US 9,658,990 B2
(45) Date of Patent: May 23, 2017

(54) REORDERING TEXT FROM UNSTRUCTURED SOURCES TO INTENDED READING FLOW

(71) Applicant: International Business Machines Corporation, Armonk, NY (US)

(72) Inventors: Nicholas V. Bruno, Cary, NC (US); Jared M. Smythe, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 274 days.

(21) Appl. No.: 14/490,076

(22) Filed: Sep. 18, 2014

(65) Prior Publication Data
US 2016/0085727 A1    Mar. 24, 2016

(51) Int. Cl.
*G06F 17/22* (2006.01)
(52) U.S. Cl.
CPC ...... *G06F 17/2235* (2013.01); *G06F 17/2264* (2013.01)
(58) Field of Classification Search
CPC .................................................. G06F 17/22646
See application file for complete search history.

(56) References Cited

U.S. PATENT DOCUMENTS

| | | | |
|---|---|---|---|
| 6,915,484 B1* | 7/2005 | Ayers .................... | G06F 17/212 345/619 |
| 8,176,414 B1 | 5/2012 | Baluja | |
| 2004/0146199 A1 | 7/2004 | Berkner et al. | |
| 2005/0210371 A1 | 9/2005 | Pollock et al. | |
| 2005/0210372 A1* | 9/2005 | Kraft ..................... | G06F 17/212 715/205 |
| 2006/0271847 A1 | 11/2006 | Meunier | |
| 2006/0288278 A1* | 12/2006 | Kobayashi ............ | G06F 17/212 715/209 |
| 2007/0052997 A1 | 3/2007 | Hull et al. | |
| 2008/0092040 A1 | 4/2008 | Nakamura | |
| 2009/0083332 A1 | 3/2009 | Datta et al. | |
| 2009/0193331 A1 | 7/2009 | Croft et al. | |
| 2010/0179991 A1 | 7/2010 | Lorch et al. | |
| 2014/0208197 A1* | 7/2014 | Ellis ...................... | G06F 17/212 715/234 |

(Continued)

OTHER PUBLICATIONS

Bruno et al., "Recording Text from Unstructed Sources to Intended Reading Flow," U.S. Appl. No. 14/640,987, filed Mar. 6, 2015, 54 pages.

(Continued)

*Primary Examiner* — Kyle Stork
(74) *Attorney, Agent, or Firm* — VanLeeuwen & VanLeeuwen; Diana R. Gerhardt

(57) ABSTRACT

An approach is provided in which a number of sections from a sequence of characters included in a Portable Document Format (PDF) file are identified. Each of the identified sections includes a unique set of coordinate positions. The approach builds links between the sections based on a relative position of each of the sections in relation to the other sections along an axis. The approach repeatedly merges sections based on the links that were built to form increasingly larger sections until a final larger section is generated with the characters appearing in a manner consistent with human reading of the rendered PDF document rather than the placement of the characters found within the original PDF file.

16 Claims, 14 Drawing Sheets

(56) References Cited

U.S. PATENT DOCUMENTS

| | | | |
|---|---|---|---|
| 2014/0245122 A1 | 8/2014 | Oro et al. | |
| 2014/0253977 A1 | 9/2014 | King et al. | |
| 2014/0301644 A1* | 10/2014 | Koh .................. | G06K 9/00469 382/175 |
| 2015/0134448 A1 | 5/2015 | Tung et al. | |
| 2016/0140145 A1 | 5/2016 | Bruno et al. | |

OTHER PUBLICATIONS

U.S. Appl. No. 14/640,987, filed Mar. 6, 2015.
"List of IBM Patents or Patent Applications Treated as Related," Letter from Leslie A. Van Leeuwen, Oct. 27, 2016, 1 page.

* cited by examiner

REORDERING TEXT FROM UNSTRUCTURED SOURCES TO INTENDED READING FLOW

BACKGROUND

Unstructured documents (such as PDFs) are expressed as a series of stateful graphic drawing operations. These drawing operations dictate where particular characters and graphics are placed in the output as well as metadata regarding such characters and graphics. For example, the drawing operation may be to move the cursor to a particular position (e.g., 100,200), set the font, font size, and font color, and print a particular character (e.g., "W", etc.) at that location. Next the drawing operations might move the cursor to another position (e.g., 100, 210) and print another character (e.g., "a", etc.) at that location.

The order in which these drawing operations occur dictates the order that the characters are received as input when the text is programmatically extracted from the PDF document. However, the order that the characters appear in the PDF document is different from the order in which the output is read by a reader of the outputted document. Often, the order in which the characters are found in the PDF correspond to the order that the PDF was written and might have little relevance to the order in which a human reader will actually read the document. For example, in PDF document that includes a title that spans the entire top of the page and an article body that appears in three columns, the first characters output may be found in the middle column, followed by characters found in the first column, followed by characters found in the third column, and finally followed by the characters that form the title across the top of the page. This divergence between the order that characters appear in the PDF document and the order in which the outputted document is consumed by a reader causes many challenges for computer operations that consume unstructured documents.

BRIEF SUMMARY

According to one embodiment of the present disclosure, an approach is provided in which a number of sections from a sequence of characters included in a Portable Document Format (PDF) file are identified. Each of the identified sections includes a unique set of coordinate positions. The approach builds links between the sections based on a relative position of each of the sections in relation to the other sections along an axis. The approach repeatedly merges sections based on the links that were built to form increasingly larger sections until a final larger section is generated with the characters appearing in a manner consistent with human reading of the rendered PDF document rather than the placement of the characters found within the original PDF file.

In another embodiment, the approach inputs the final larger section to a corpus that is utilized by a question answering (QA) system. The natural language processing (NLP) performance of the QA system is consequently increased by performing NLP operations on the final larger section instead of the original PDF file.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
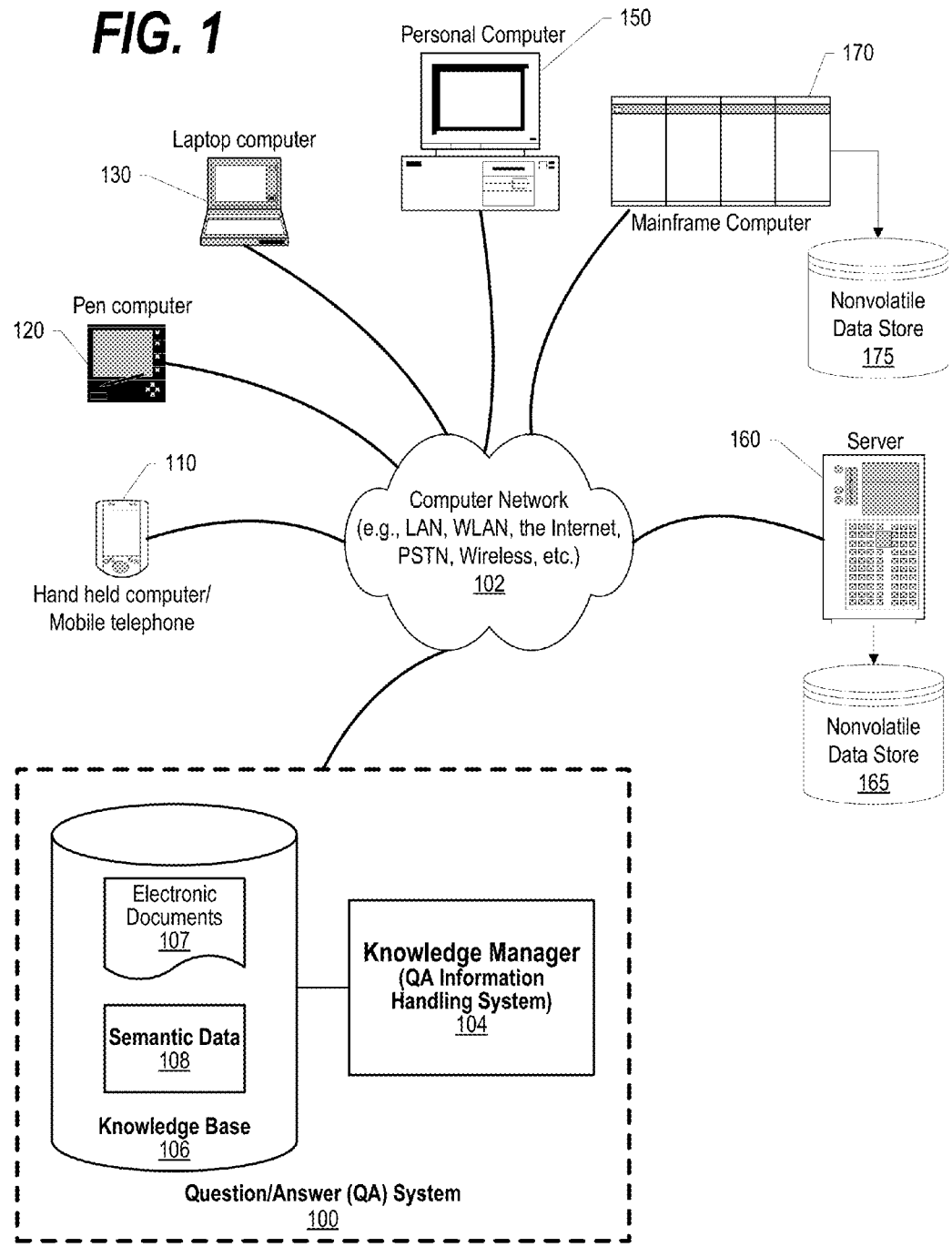
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
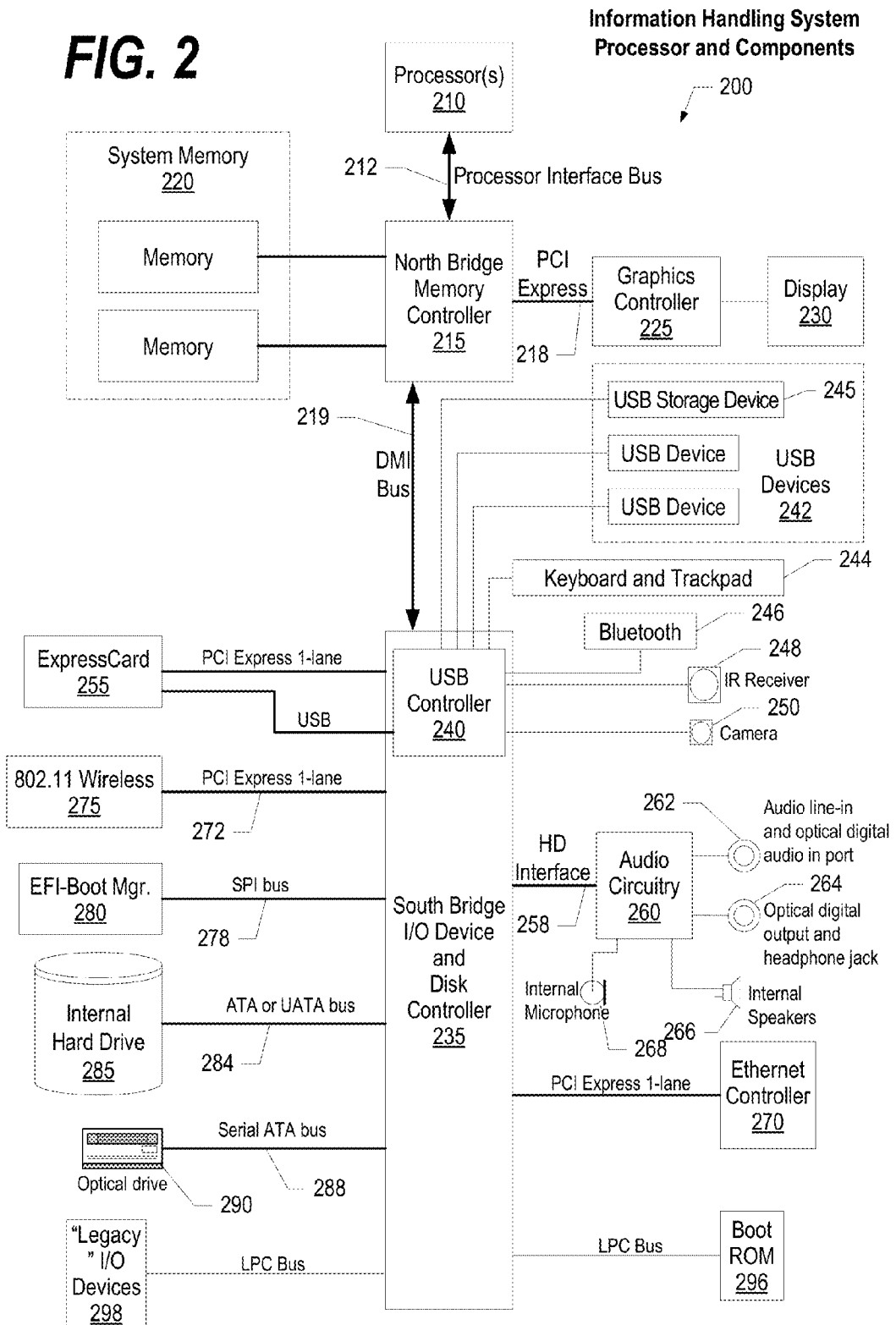
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-14 depict an approach that can be executed on an information handling system that reorders text from unstructured sources, such as Portable Document Format (PDF) sources, to a stream of characters coinciding with the intended reading flow of the document. FIGS. 3-7 provide an example of how a stream of characters are extracted from a PDF source file to form sections that are rendered on an output device. The position of the sections in the rendition are shown having little relation to the order that the graphic drawing operations were found in the source PDF file. The example shown in FIGS. 3-7 further depicts example section data for the various sections as well as a visual representation showing how the various sections are merged to finally form a final larger section that would be suitable for ingestion by a process. One such process is an ingestion process utilized by a question answering (QA) system that ingests documents and uses Natural Language Processing (NLP) operations on the documents to answer questions posed by users. Because the ordering of the final larger section that results from the merger is in an order coinciding with the intended reading of the document, rather than the order in which the operations appear in the PDF source, the efficiency of the QA system in using NLP operations to ingest the final larger section is improved which improves the functionality of the QA system. The performance of other computer systems, such as those that utilize NLP operations to extract content from online sources (e.g., search engines, text processors, etc.), would also be improved by utilizing the final larger section rather than utilizing the source PDF file.

FIGS. 8-14 show the processes utilized to reorder the text from unstructured sources, such as that found in PDFs, to a form a single section that is ordered in an intended human reading order, rather than the order that the graphic drawing operations appeared in the PDF source file. Sections are identified from the stream of characters extracted from the PDF source file based on spacing of characters, such as white space, given the individual characters' coordinate positions. Links, both vertical and horizontal, between the identified sections are established to facilitate merging based upon different sets of rules. Sections are repeatedly merged with each other to form increasingly larger sections until a final larger section is generated. After sections are merged, the link builder rebuilds links between the newly merged (larger) section and the other sections.

Rules used to identify mergers include special rules and main rules. Special rules are utilized to identify sections to merge that fall outside the main rules. Examples of special rules include merging "island" sections in a document that are not positioned vertically or horizontally with other sections as well as merging initial sections with appropriate sections. Initial sections are initial characters such as a first capital character of a paragraph rendered in a larger font size, often much larger, than the font sized used for characters in the subsequent paragraph body. The process merges the initial character with the subsequent paragraph body using a special rule.

Main rules identify sections to merge based on vertical and horizontal proximity to each other. A selected section identified with a single down link to a reference section are merged with the reference section so long as the reference section only has a single up link to the selected section. In one embodiment, all sections that can be vertically merged using the rule are processed and merged before moving to horizontal rules. In this embodiment, when no more vertical merger candidates are found, the horizontal merging rules select and merge a section with a single right link to a reference section so long as the reference section only has a single left link to the selected section. The repeated performance of the special rules and the main rules ultimately results in a single larger section that contains the characters from the original PDF ordered in the intended human reading order rather than the order that the characters were found in the PDF source file.

While the descriptions provided herein pertain to languages intended to be read from left to right and top to bottom, it will be appreciated that such teachings and concepts can be applied to languages that are intended to be read in a different fashion. For example, languages that are intended to be read from right to left can use merger rules that append the text from sections on the left side of a page to sections on the right side of the page.

Figure 3:
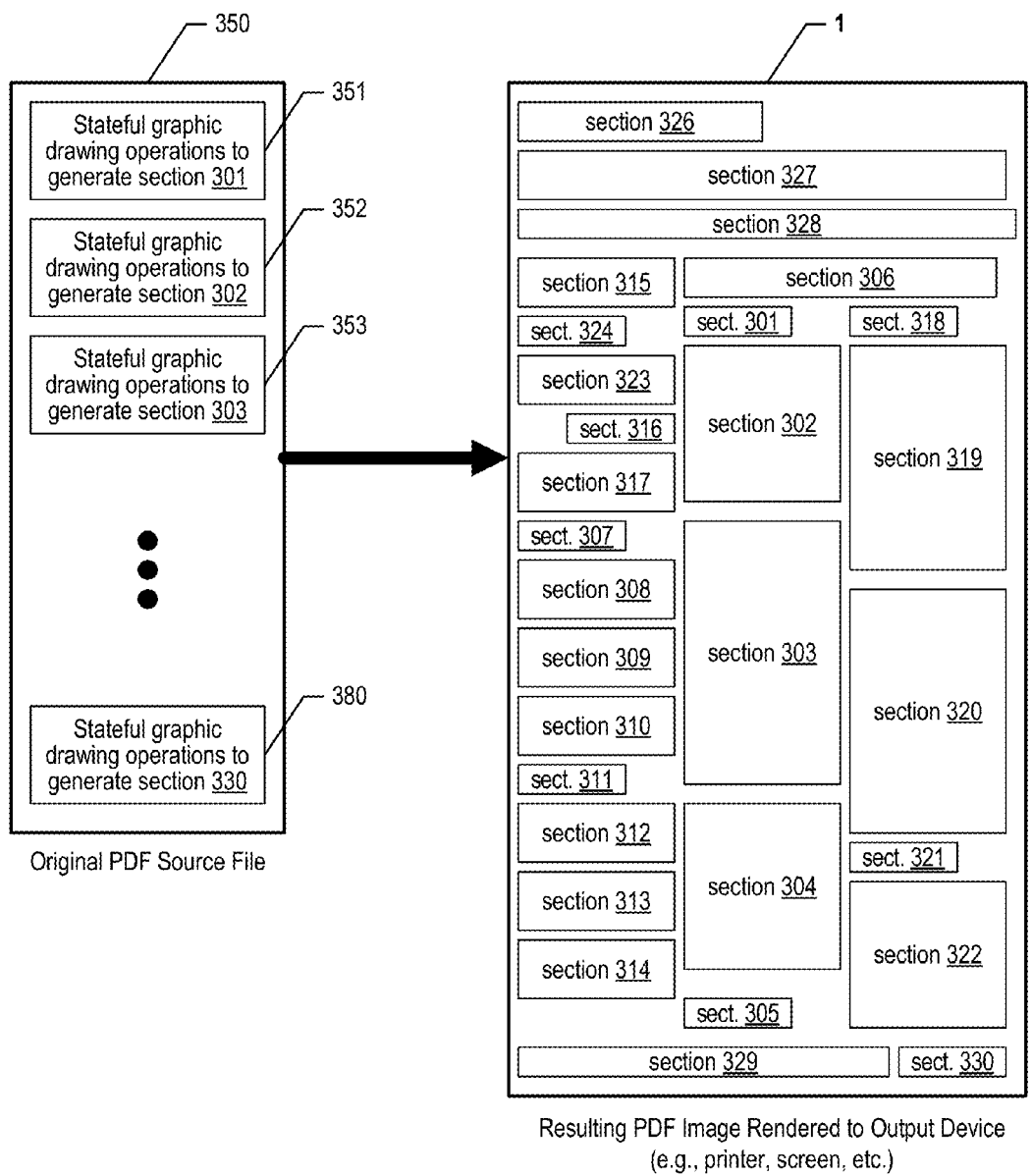
FIG. 3 is an exemplary diagram depicting the relationship between a Portable Document Format (PDF) source and a resulting rendition of the PDF source.

FIG. 3 is an exemplary diagram depicting the relationship between a Portable Document Format (PDF) source and a resulting rendition of the PDF source. Original PDF source file 350 shows a number of stateful graphic drawing operations that, when processed, render PDF image 1. For simplicity, a contiguous set of stateful graphic operations is shown corresponding to a particular section however, this need not be the case, as the operations used to render a particular section might be disjointed within PDF source file 350. Stateful graphic drawing operations 351 are used to render section 301, stateful graphic drawing operations 352 are used to render section 302, stateful graphic drawing operations 353 are used to render section 303, with further operations used to render sections 304 through 329 until stateful graphic drawing operations 380 are used to render section 330.

Figure 5:
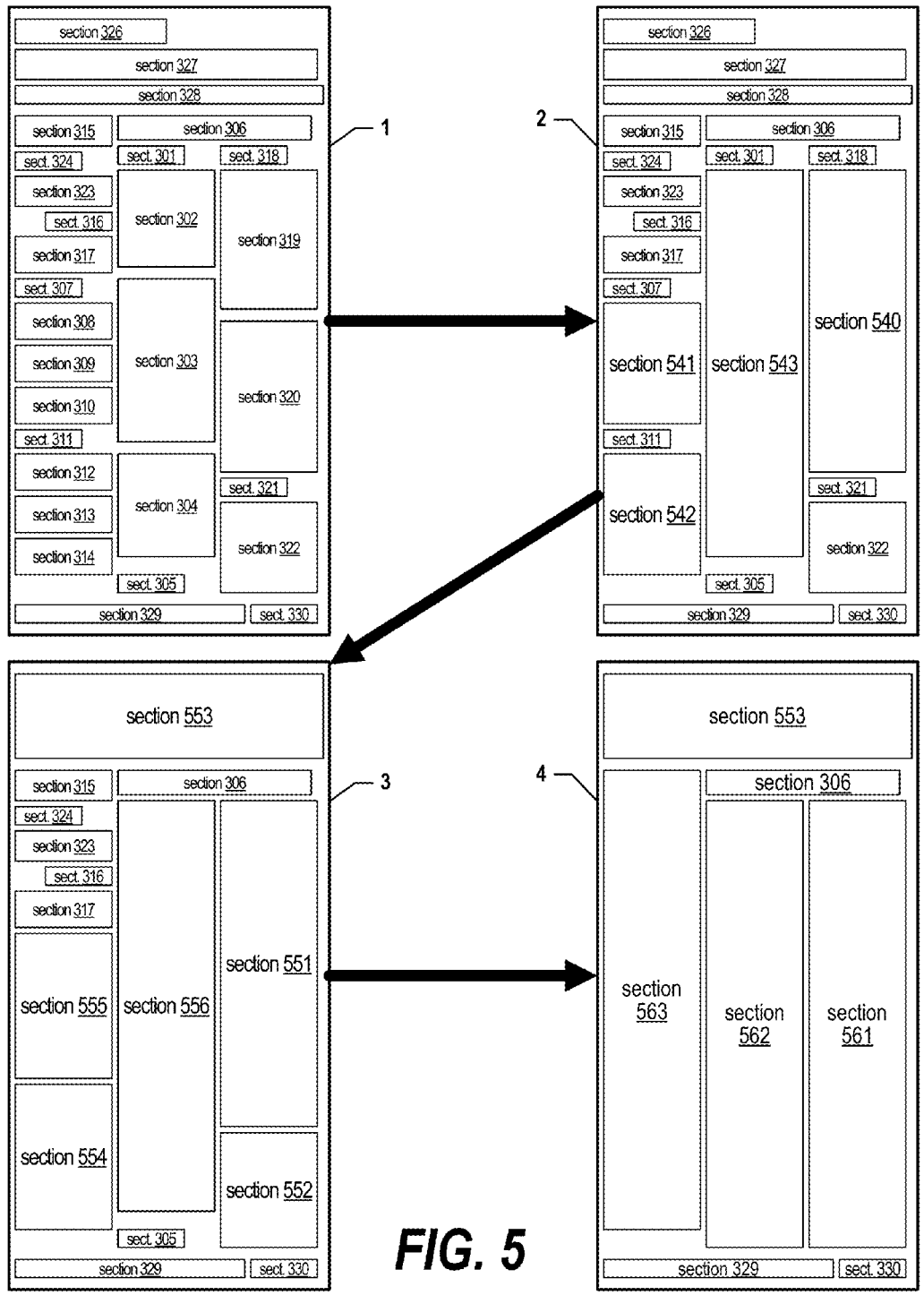
FIG. 5 is an exemplary diagram depicting the first three merging operations that merge sections into larger sections based on the reading flow of the rendered PDF document.
Figure 6:
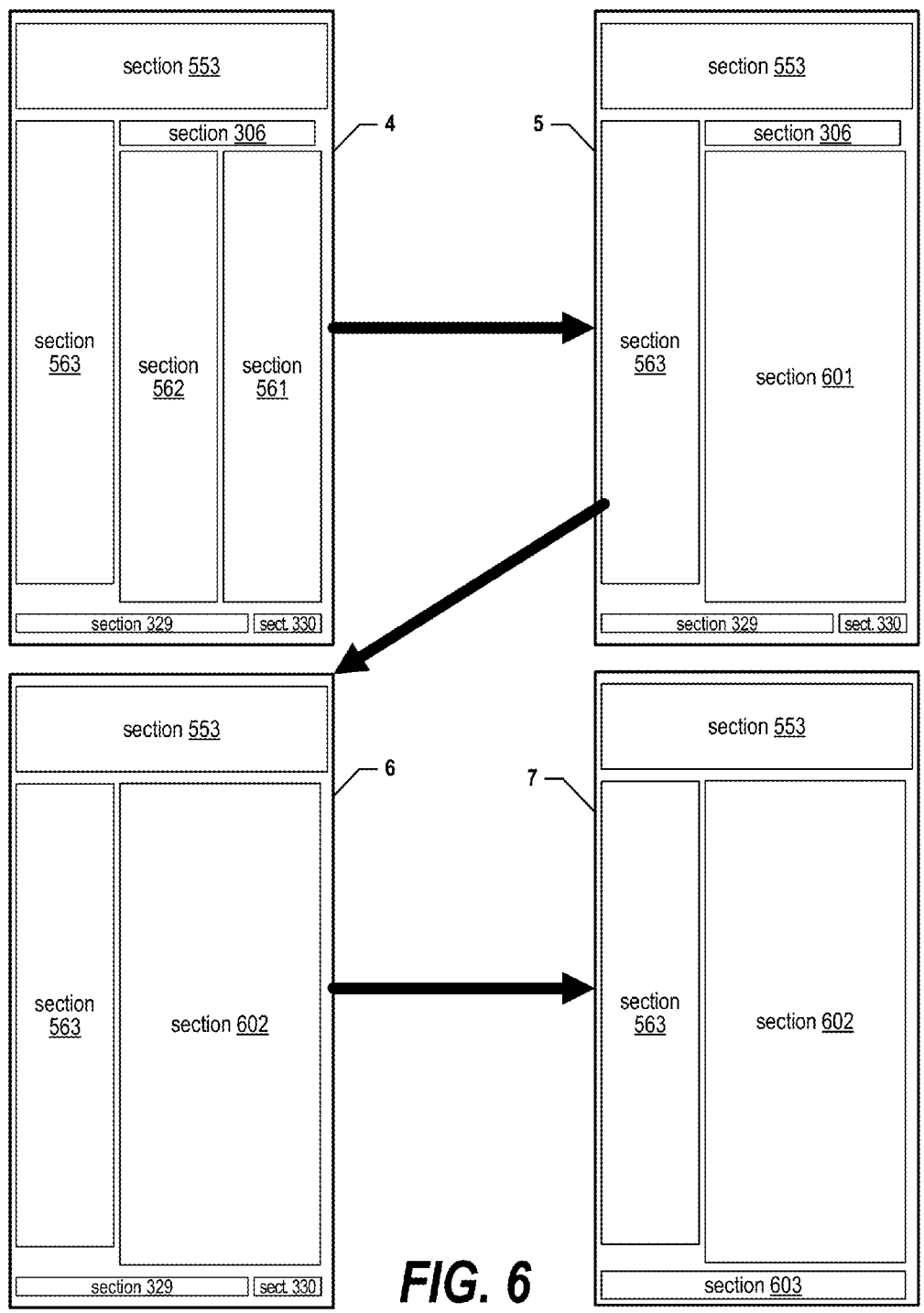
FIG. 6 is an exemplary diagram depicting the next three merging operations that further merge sections into larger sections based on the reading flow of the rendered PDF document.
Figure 7:
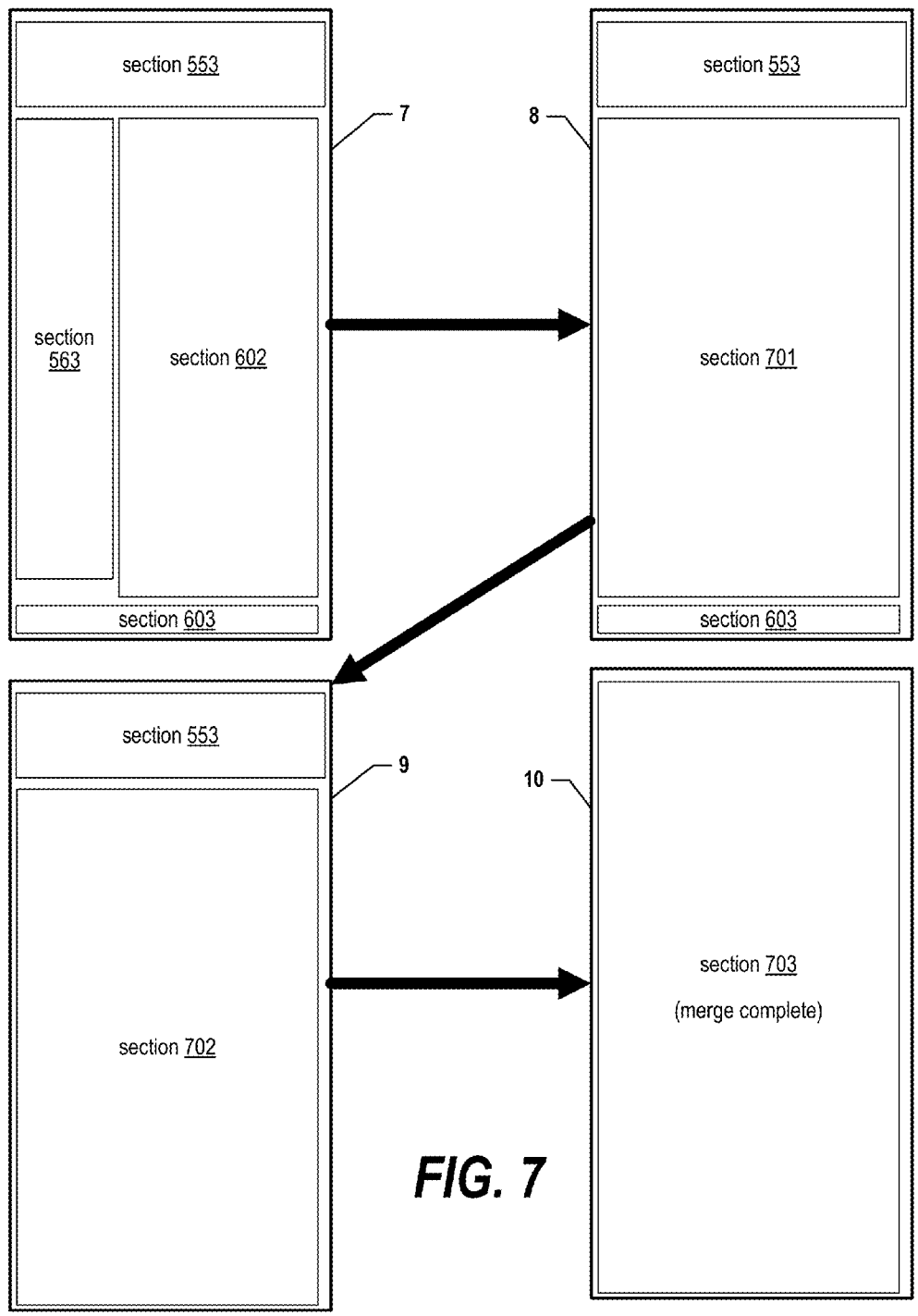
FIG. 7 is an exemplary flowchart depicting the last three merging operations that further merge sections into increasingly larger sections with the final result being a single section where all of the characters appear in the order that they are likely intended to be read by a human reader.

The ordering of the sections in resulting PDF image 1 does not coincide with the order of the stateful graphic drawing operations found in original PDF file 350. For example, the first set of stateful graphic operations (351) renders section 301 which is found below sections 326, 327, 328, and 306 and to the right of sections 315 and 324. Conversely, the first section that appears at the top of PDF image 1 (section 326) is the 26th set of stateful graphics operations found in PDF source file 350. FIGS. 5-7 show examples of how repeated merging of the sections shown in PDF image 1, using the processes shown in FIGS. 8-14, results in a final section of text ordered in human-readable fashion. In the example, the order of text in the final merged file would be section 326 followed, in order, by sections 327, 328, 315, 324, 323, 316, 317, 307, 308, 309, 310, 311, 312, 313, 314, 306, 301, 302, 303, 304, 305, 318, 319, 320, 321, 322, 329, and finally section 330.

Figure 4:
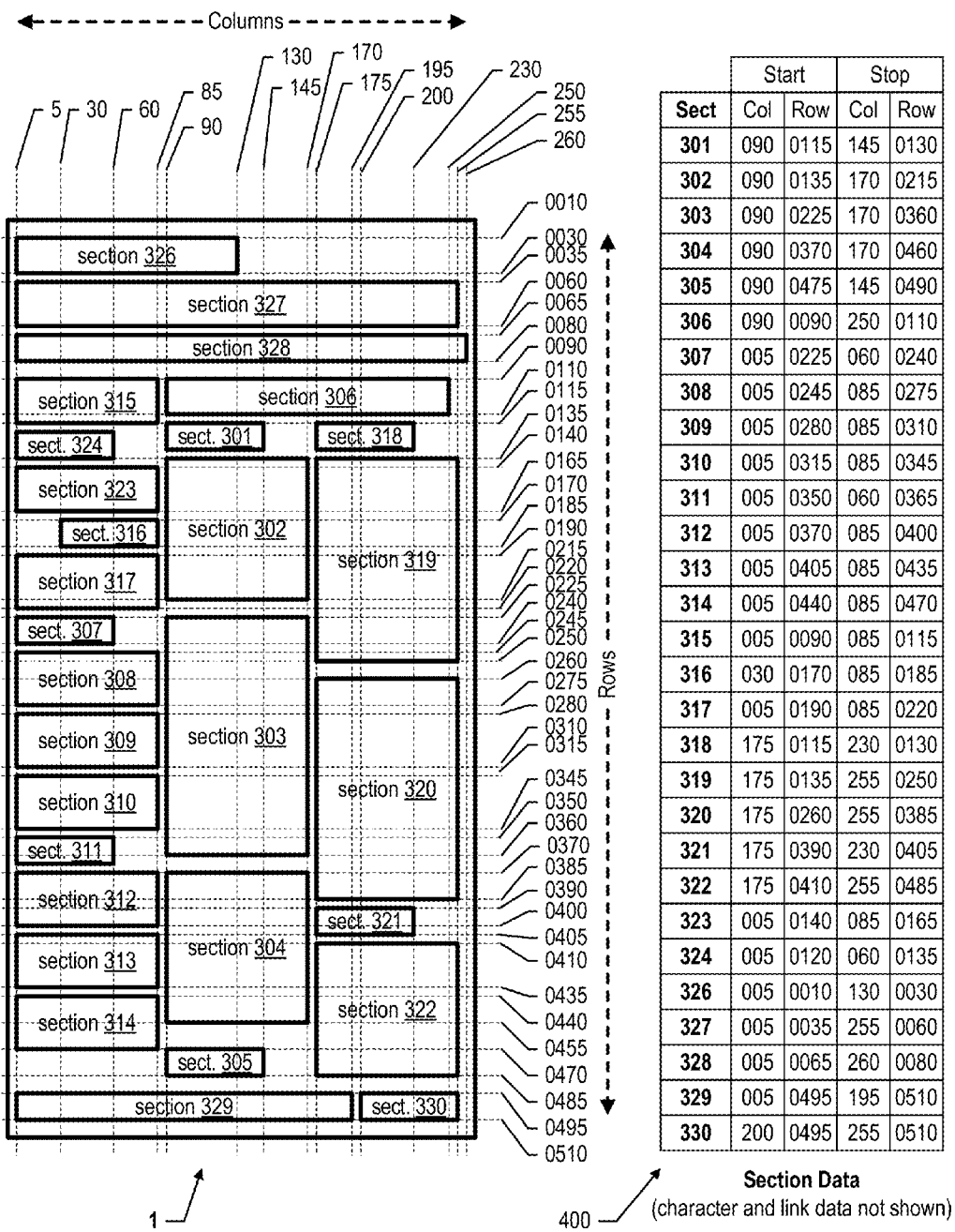
FIG. 4 is an exemplary diagram depicting sections derived from the PDF source and their respective coordinate positions.

FIG. 4 is an exemplary diagram depicting sections derived from the Portable Document Format (PDF) source and their respective coordinate positions. PDF image 1 is shown overlaid with exemplary row and column positional markers showing the coordinate positions of the various sections. Section data 400 is a table of boundary coordinates of the imaginary rectangle bounding each of the sections. Each of the sections is identified by a unique section number (section numbers 301 through 330). A set of start coordinates (row and column) is provided indicating the upper left hand corner of each sections' boundary rectangles and a set of stop coordinates (row and column) is also provided indicating the lower right hand corner of each sections' boundary rectangles. The relative position of each sections' coordinates are used to find overlap between sections in both vertical and horizontal directions.

Sections are linked to one another when an overlap is found and no intervening sections are detected. For example, section 320 has vertical commonality (one or more shared x coordinates) with sections 327, 328, 306, 318, 319, 321, 322, 329, and 330. However, a vertical link is only established between section 320 and sections 319 and 321. An upward link is established between section 320 and section 319 and a downward is established between section 320 and section 321 because the other sections listed have one or more intervening sections positioned between them and section 320. Likewise, section 320 has horizontal commonality (one or more shared y coordinates) with sections 308, 309, 310, 311, 312, 303, and 304. However, horizontal links are only established between section 320 and 303 and between 320 and 304, both in a left direction. There are no sections to the right of section 320, so the right links associated with section 320 would be blank or zero to indicate that no such links exist.

The detection of vertical commonality and any intervening sections can readily be found by processing section data 400 which essentially follows the row and column positional markers shown overlaid onto PDF image 1. The actual character data (text of paragraph, titles, headings, etc.) as well as character metadata is also associated with, or stored with, the corresponding section in section data 400. In addition, links (up links, down links, left links, and right links) to other sections, as described above, are also associated with the respective section identifier. Using the section 320 example from above, section data 400 includes the sections unique section identifier (in this case, section 320), rectangular boundary starting coordinates of section 320 (in this case, column 175 and row 0260), and rectangular boundary stopping coordinates of section 320 (in this case, column 255 and row 0385). Looking at the overlay of PDF image 1, the coordinates form a rectangular area forming a boundary around section 320 and do not include any other sections in the bounded area. Character data, such as text of a paragraph that appears in the bounded rectangular area, would also be associated with section 320 as well as character metadata (e.g., font size, font color, etc.). Link data would also be associated with section identifier 320. In this case, vertical links would include an up link to link section 320 upward to section 319 and a down link to link section 320 downward to section 321. Horizontal links would include two left links—one left link linking section 320 to section 303 and another left link linking section 320 to section 304. The sections linked to section 320 would also have links back to section 320 as well as other links to other sections.

When two or more sections are merged, section data is updated to reflect the larger rectangular boundary used to bound the merged sections. As shown in FIG. 5, section 320 will be merged with section 319 forming a new larger section (section 540). A merger combines the coordinate data from the merged sections as well as the data and metadata with the data being combined based upon the relative positions of the sections that were merged. A new entry is made to section data reflecting both the combined coordinate data. Section 540's rectangle start coordinates would be column 175 and row 0135 the same as section 319's starting coordinates, and its rectangle stop coordinates would be column 255, row 385 which is the same as section 320's stopping coordinates. Data and metadata associated with section 320 would be appended to data and metadata associated with section 319 with the combined data associated with new section 540. Links would then be built between section 540 and other sections. Sections 319 and 320 are either removed or marked as inactive in section data 400. After the merger, sections 319 and 320 are no longer active, consequently any links to either of these sections from other sections are rebuilt. For example, section 321's uplink to section 320 is discarded and a new uplink is established between section 321 and new section 540. Likewise, section 318's downlink to section 319 is also discarded and a new downlink is established between section 318 and 319. Similarly, right links associated between section 302 and section 319, section 303 and sections 319 and 320, and section 304 and section 320 are all discarded and new right links are established between section 302 and new section 540, section 303 and new section 540, and section 304 and new section 540.

FIG. 5 is an exemplary diagram depicting the first three merging operations that merge sections into larger sections based on the reading flow of the rendered Portable Document Format (PDF) document. Sections are candidates for vertical merging when each has one and only one vertical link to the other section. For example, sections 319 and 320 are merger candidates because section 319 has one, and only one, downlink to section 320 and, conversely, section 320 has one, and only one, uplink and that uplink is to section 319. On the other hand, sections 306 and 318 are not candidates for vertical merging because, while section 318 only has a single uplink to section 306, section 306 has more than one downlinks (one to section 301 and another to section 318).

Various sections shown in PDF image 1 are vertically merged forming PDF image 2. In particular, new section 540 is formed by the merger of sections 319 and 320, new section 541 is formed by the merger of sections 308, 309, and 310, new section 542 is formed by the merger of sections 312, 313, and 314, and new section 543 is formed by the merger of sections 302, 303, and 304. As previously mentioned, in one embodiment vertical merging of sections is performed until no more vertical merging is possible, at which point horizontal merging is performed.

PDF image 3 shows the result of merging various sections from PDF image 2. In particular, new section 551 is formed by the merger of sections 318 and 540, new section 552 is formed by the merger of sections 321 and 322, and new section 553 is formed by the merger of sections 326, 327, and 328. New section 554 is formed by the merger of sections 311 and 542, new section 555 is formed by the merger of sections 307 and 541, and new section 556 is formed by the merger of sections 301 and 543.

PDF image 4 shows the result of merging various sections from PDF image 3. In particular, new section 561 is formed by the merger of sections 551 and 552, new section 562 is formed by the merger of sections 556 and 305, and new section 563 is formed by the merger of sections 315, 324, 323, 316, 317, 555, and 554.

FIG. 6 is an exemplary diagram depicting the next three merging operations that further merge sections into larger sections based on the reading flow of the rendered Portable Document Format (PDF) document. As previously described, sections are candidates for vertical merging when each section has one, and only one, vertical link to the other section. In PDF image 4, there are no more candidates for vertical merging. Consequently, horizontal merging commences. PDF image 5 shows the result of horizontal merging various sections from PDF image 4. In particular, new section 601 is formed by the horizontal merger of sections 561 and 562.

After horizontal merging, the process checks to determine if more vertical merging is possible after the horizontal merging has taken place. PDF image 6 shows the result of further vertical merging sections from PDF image 5. In particular, section 601 can now be vertically merged with section 306 forming new section 602.

Since no further vertical merging can be performed, further horizontal merging is performed. PDF image 7 shows the result of horizontally merging sections from PDF image 6. In particular, section 603 is formed from the horizontal merger of sections 329 and 330.

FIG. 7 is an exemplary flowchart depicting the last three merging operations that further merge sections into increasingly larger sections with the final result being a single section where all of the characters appear in the order that they are likely intended to be read by a human reader. None of the sections shown in PDF image 7 are candidates for vertical merging so further horizontal merging is performed. PDF image 8 shows the result of horizontally merging sections found in PDF image 7. In particular, new section 701 is formed by horizontally merging sections 663 and 602.

After horizontal merging is performed to create PDF image 8, further vertical merging is performed on the sections to generate PDF image 9. In particular, new section 702 is formed by vertically merging sections 701 and 603. Finally, as shown in PDF image 10, the last remaining sections from PDF image 9, sections 553 and 702, are vertically merged to form final large section 703. Since PDF image 10 has only a single section, merging of the sections is complete. Section 703 now contains the text from the original PDF ordered in a human-readable fashion. The text from section 703 can be digested by Natural Language Processing (NLP) operations to improve the functionality of systems that utilize unstructured data. These systems include question answering (QA) systems, such as QA system 100 shown in FIG. 1.

Figure 8:
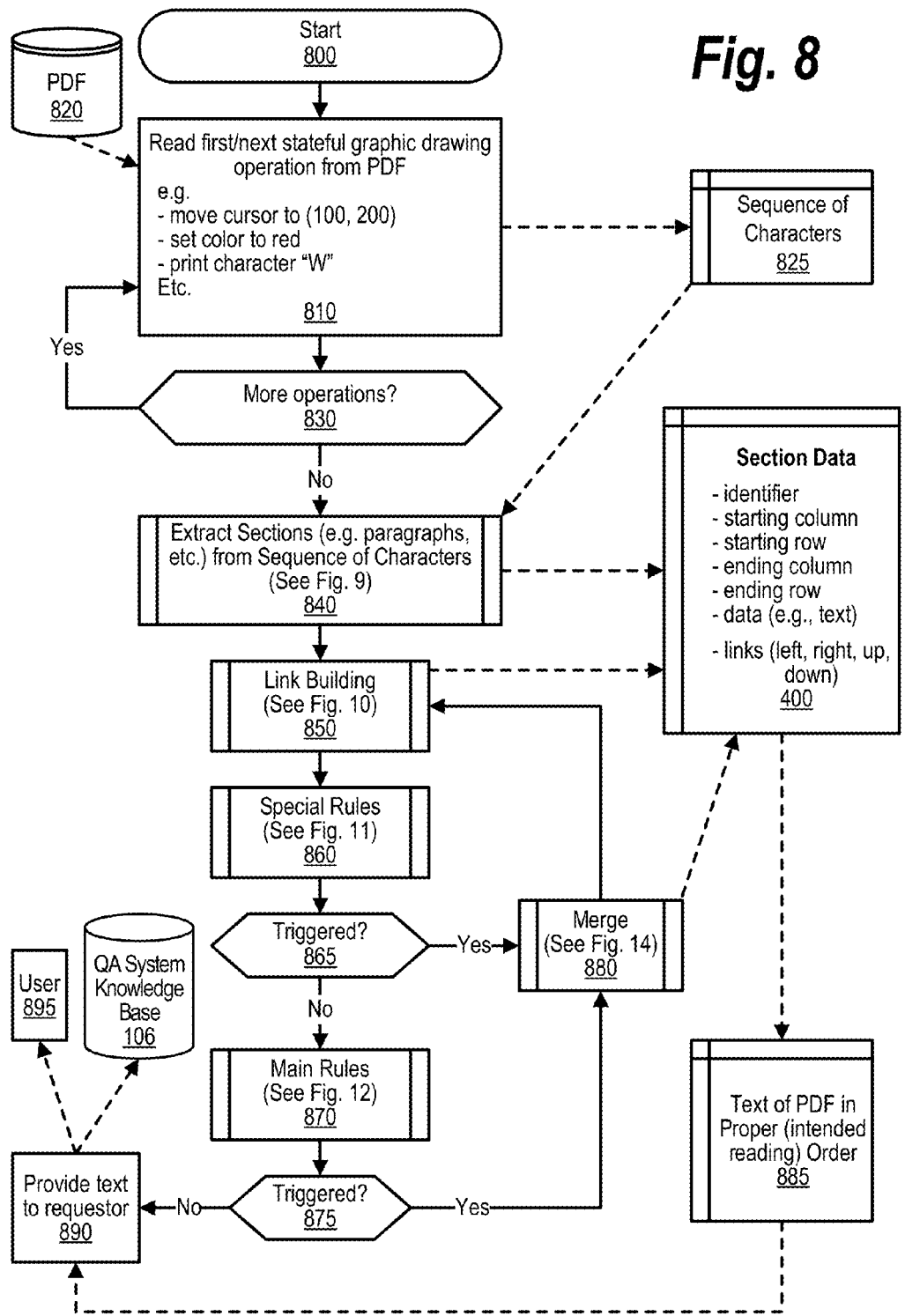
FIG. 8 is an exemplary flowchart depicting overall steps performed by the process that reorders text from unstructured sources, such as PDFs, to a stream of characters coinciding with the intended reading flow of the document.

FIG. 8 is an exemplary flowchart depicting overall steps performed by the process that reorders text from unstructured sources, such as Portable Document Format (PDF) sources, to a stream of characters coinciding with the intended reading flow of the document. FIG. 8 commences at 800 and shows the steps taken by a process that reorders text from unstructured sources, such as that found in PDFs, to a form a single section that is ordered in an intended human reading order, rather than the order that the graphic drawing operations appeared in the PDF source file. At step 810, the process reads the first stateful graphic drawing operation from PDF source 820. For example, a stateful graphic drawing operation may be to move the cursor to a particular position (e.g., 100, 200), set the font color to a particular color (e.g., red, etc.), and print a particular character (e.g., "W", etc.) at the location. In a PDF, a stateful graphic drawing operation is performed for each character and graphic element to be rendered on the output device, such as a screen or printer. Step 810 stores the character data, as well as metadata pertaining to such characters, in sequence of characters memory area 825. The process determines as to whether more stateful graphic drawing operations are included in the PDF source (decision 830). If more operations are included, then decision 830 branches to the 'yes' branch which loops back to step 810 to read the next stateful graphic drawing operation from the PDF and store the character data in memory area 825. This looping continues until all of the stateful graphic drawing operations included in the PDF have been processed, at which point decision 830 branches to the 'no' branch for further processing.

Figure 9:
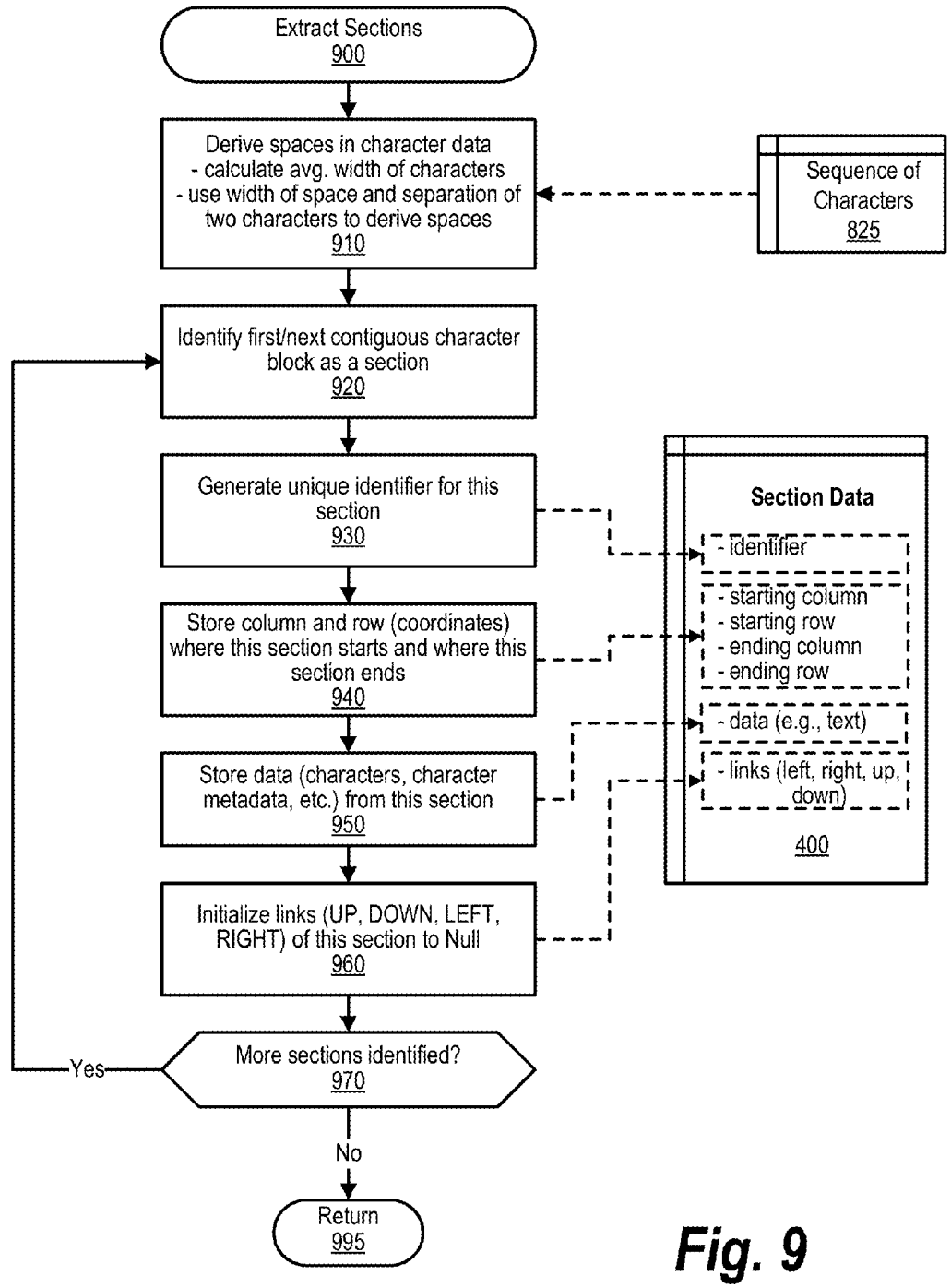
FIG. 9 is an exemplary flowchart depicting steps that extract sections from a sequence of characters found in the PDF source.

At predefined process 840, the process performs the Extract Sections from Sequence of Characters routine (see FIG. 9 and corresponding text for processing details). Sections might include such textual areas such as paragraphs, headings, titles, and the like. Predefined process 840 processes the sequence of characters data from memory area 825 and identifies spacing between sets of characters that indicates a section, such as a paragraph, title, etc. Data regarding the sections are stored in memory area 400. This data includes a unique section identifier, the coordinates that form a rectangular boundary around the section (e.g., upper left hand row and column coordinates, lower right hand row and column coordinates, etc.), and the data belonging to the section (e.g., the text of a paragraph, heading, title, etc.). In addition, each section can be associated with links (uplink(s) to section(s) above this section, downlink(s) to section(s) below this section, right link(s) to sections to the right of this section, and left link(s) to sections to the left of this section).

Figure 10:
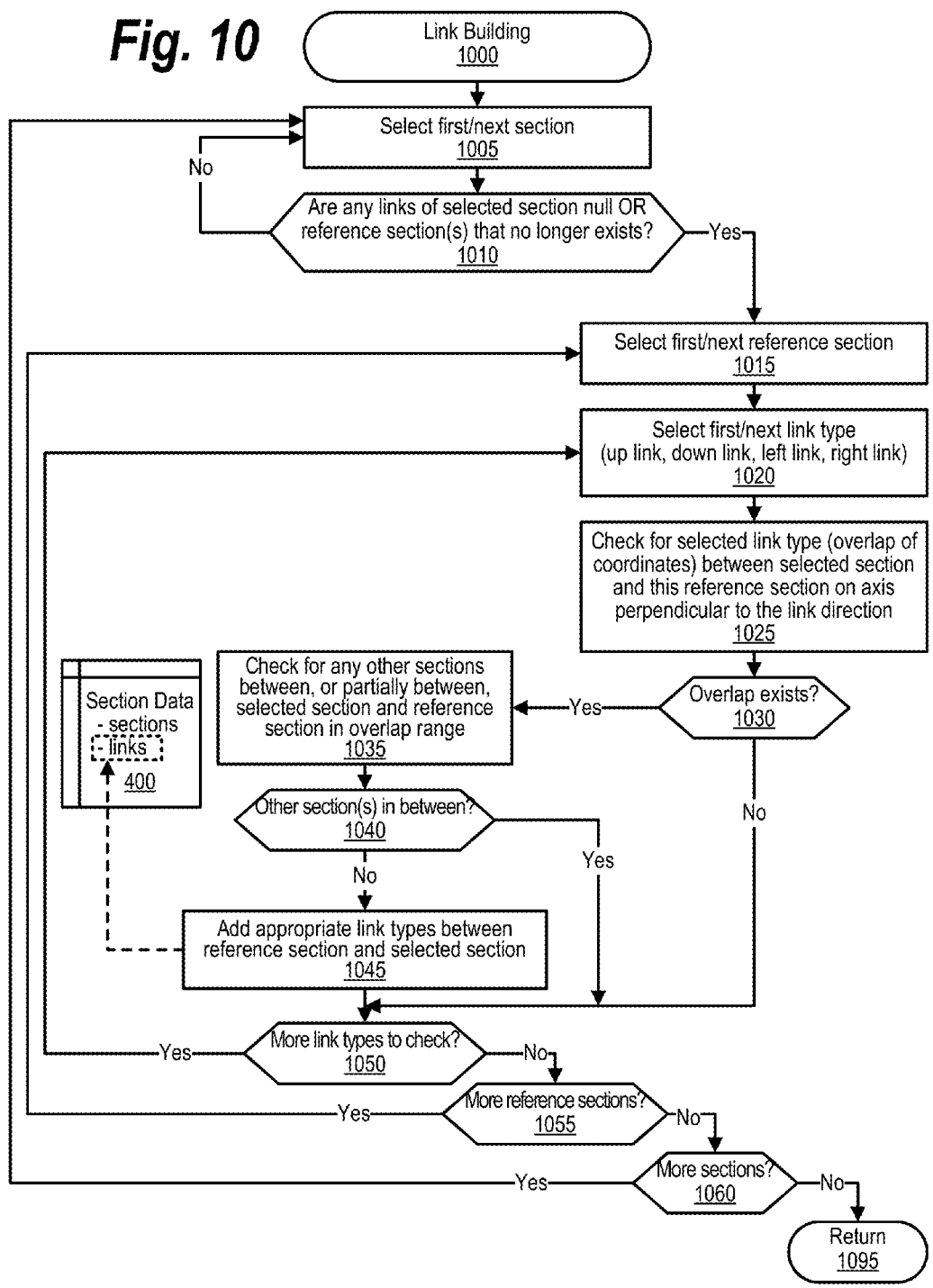
FIG. 10 is an exemplary flowchart depicting steps that build various types of links between the sections.

At predefined process 850, the process performs the Link Building routine (see FIG. 10 and corresponding text for processing details). As the name implies, the Link Building routine identifies and establishes links between the various sections. The links are established with the various sections included in the section data that is stored in memory area 400. The links built by the Link Building routine are used to identify sections to merge by following sets of "special rules" and sets of "main rules." Main rules are used to identify sections to merge based upon vertical and horizontal proximity to one another. Special rules, on the other hand, are rules for merging sections that fall outside the main rules.

Figure 11:
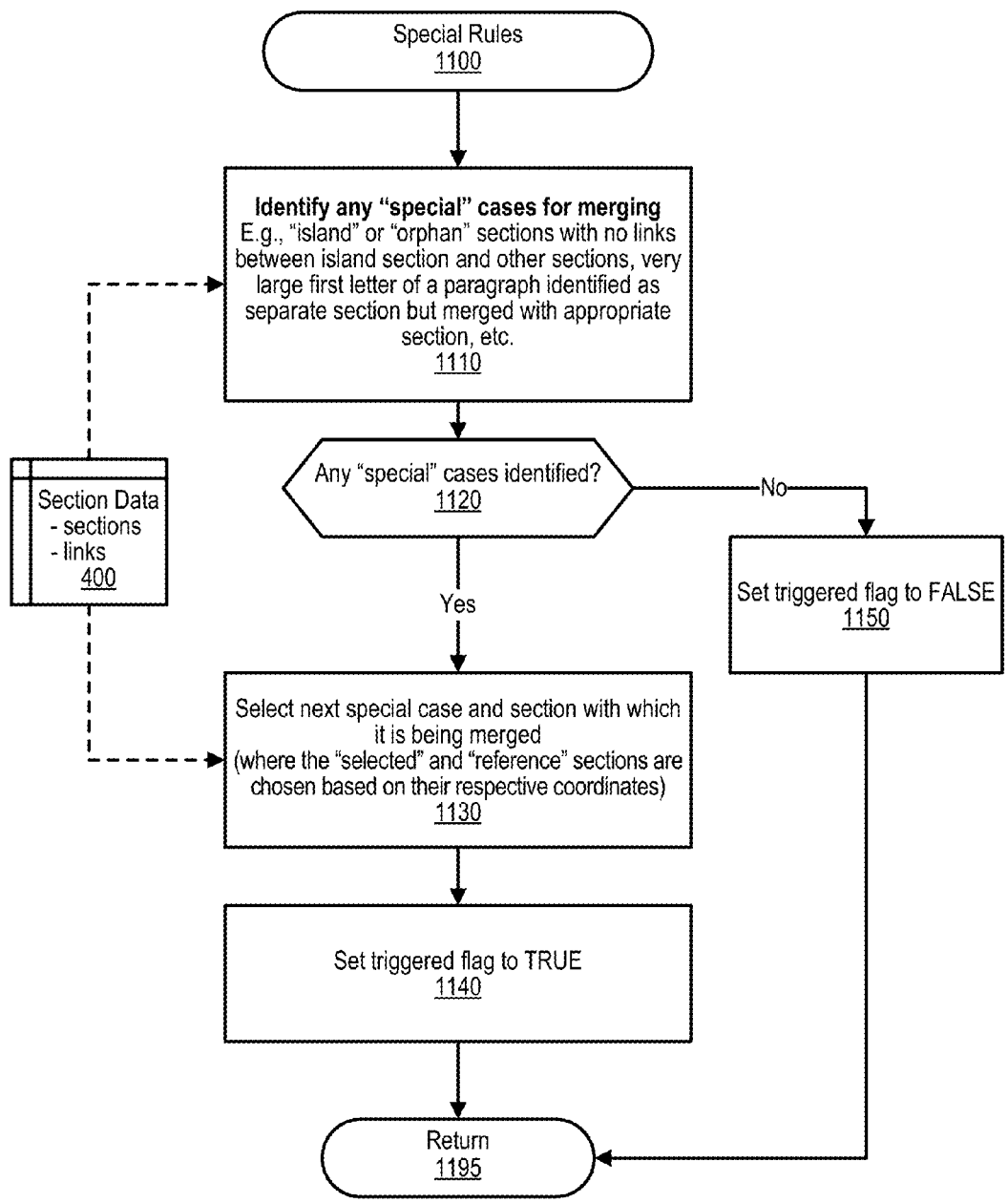
FIG. 11 is an exemplary flowchart depicting steps that perform special rules on some sections found in the unstructured source.

At predefined process 860, the process performs the Special Rules routine (see FIG. 11 and corresponding text for processing details). After the Special Rules are performed, the process determines as to whether any of the special rules were triggered identifying sections to merge based on the special rules (decision 865). If a special rule was triggered, then decision 865 branches to the 'yes' branch whereupon, at predefined process 880, the sections identified for merging based on the special rules are merged (see FIG. 14 and corresponding text for details regarding the merge process). Processing loops back to the Link Building routine (predefined process 840) after the merge routine completes.

On the other hand, if none of the special rules were triggered, then decision 865 branches to the 'no' branch. Following the 'no' branch, at predefined process 870, the process performs the Main Rules routine (see FIG. 12 and corresponding text for processing details). The main rules identify sections to merge based upon vertical proximity to one another and, if no vertically proximate sections can be merged, then the main rules identify sections to merge based upon horizontal proximity to one another. The process determines as to whether any main rules (vertical or horizontal) were triggered by predefined process 870 (decision 875). If a vertical or horizontal rule was triggered, then decision 875 branches to the 'yes' branch whereupon the sections identified for main rule merging are merged using the Merge routine (predefined process 880). Processing loops back to the Link Building routine (predefined process 840) after the merge routine completes.

On the other hand, if no main rules were triggered, then decision 875 branches to the 'no' branch. Since no rules (special rules or main rules) have been triggered, there are no more sections to merge. Consequently, the character data from PDF source 820 has been consolidated into a single section that is ordered in an intended human reading order, rather than the order that the graphic drawing operations appeared in the PDF source file. The data, now arranged in an order intended for human reading, is stored in memory area 885. At step 890, the process provides the reordered data to the requestor. In one embodiment, the requestor is a process that ingests the data from memory area 885 to data store 106. In this embodiment, data store 106 is a corpus utilized by a QA system, such as QA system 100 shown in FIG. 1, to answer questions posed from a user. In another embodiment, the requestor is a user or other requesting process, in which case the data stored in memory area 885 is provided to requestor 895.

FIG. 9 is an exemplary flowchart depicting steps that extract sections from a sequence of characters found in the Portable Document Format (PDF) source. FIG. 9 commences at 900 and shows the steps taken by a process that performs the Extract Sections routine.

At step 910, the process derives spaces in the character data stored in memory area 825. The average width of characters is calculated and the process uses the width of the space and the separation between characters to derive the various spaces (vertical and horizontal spaces) in the document. Step 910 retrieves the character data and metadata from memory area 825. The character data includes the character that is printed and the metadata includes data about the character such as its coordinate positions, font, font size, font color, etc.

At step 920, the process identifies the first contiguous character block as a section. At step 930, the process generates a unique identifier to assign to this section. The process stores the section identifier in section data memory area 400. At step 940, the process stores column and row (coordinates) where this section starts and where this section ends. The coordinates form a rectangle that bound the area that the section resides on the PDF image. The rectangle's starting coordinates (column and row) are stored marking the upper left hand corner of the rectangle and the ending coordinates (column and row) are also stored marking the lower right hand corner of the rectangle. The rectangle starting and ending coordinates are stored in section data memory area 400. At step 950, the process stores the data (characters, character metadata, etc.) that are included in this section in section data memory area 400.

At step 960, the process initializes links (uplinks, downlinks, left links, and right links) of this section to Null. The link data is associated with the section identifier that is stored in section data memory area 400. In one embodiment, the link data is stored in a separate data structure and associated with the section data so that a many-to-one relationship can exist between the section and any of the link types. For example, a particular section might have zero right links, one uplink, one downlink, and multiple left links. In decision 970, the process determines as to whether more sections were identified by step 910. If more sections were identified, then decision 970 branches to the 'yes' branch which loops back to step 920 to identify the next section and store data pertaining to the newly identified section. This looping continues until there are no more sections to process, at which point decision 970 branches to the 'no' branch and processing returns to the calling routine (see FIG. 8) at 995.

FIG. 10 is an exemplary flowchart depicting steps that build various types of links between the sections. FIG. 10 commences at 1000 and shows the steps taken by a process that performs the Link Building routine. At step 1005, the process selects the first section from the section data that is stored in memory area 400. The process determines as to whether are any links associated with the selected section that are Null OR if the selected section has links that refer to one or more sections that no longer exist (decision 1010). If there are any links associated with the selected section that are Null OR if the selected section has links that refer to one or more sections that no longer exist, then decision 1010 branches to the 'yes' branch to identify any links between this section and other sections. On the other hand, if none of the links associated with the selected section are Null and selected section does not have any links referring to sections that no longer exist, then decision 1010 branches to the 'no' branch whereupon processing loops back to step 1005 to select the next section from section data 400.

At step 1015, the process selects the first reference section. During the loop, each of the other sections included in section data 400 is selected as a reference section and compared with the selected section to identify whether a link should be established between the selected section and each of the reference sections.

At step 1020, the process selects the first link type (uplink, downlink, left link, and right link). In one embodiment only one of the vertical link types (e.g., the downlink) is selected followed by selection of one of the horizontal link type (e.g., the right link) with the corresponding link being identified and established in the reference link. For example, when processing a selected section, if an uplink is detected from a selected reference section to a selected reference section then the uplink to the reference section is established in the selected section and a downlink to the selected section is established in the reference section. Likewise, if a right link is detected from a selected reference section to a selected reference section then the right link to the reference section is established in the selected section and a left link to the selected section is established in the reference section.

At step 1025, the process checks for the selected link type (overlap of coordinates) between selected section and this reference section on an axis perpendicular to the link direction. For example, when checking for an uplink from a selected section, the coordinates of reference sections above the selected section are identified as possible uplink candidates. Likewise, when checking for a right link from a selected section, the coordinates of reference sections to the right of the selected section are identified as possible right link candidates. The process determines as to whether an overlap exists between coordinates of the selected section and the reference section in the direction of the link on an axis perpendicular to the link direction (decision 1030). If an overlap exists, then decision 1030 branches to the 'yes' branch for further processing. On the other hand, if no overlap exists, then decision 1030 branches to the 'no' branch bypassing steps 1035 through 1045.

At step 1035, the process checks for any other sections between, or partially between, the selected section and the reference section in the overlap range. In essence, an imaginary rectangle is drawn between the selected section and the reference section. In the case of a vertical link (uplink/downlink), the imaginary rectangle is formed with a width being the overlap between the selected section and the reference section and a height being the distance between the bottom edge of the section with a possible downlink (e.g., the reference section) and the top edge of the section with a possible uplink (e.g., the selected section). In the case of a horizontal link (right link/left link), the imaginary rectangle is formed with a height being the overlap between the selected section and the reference section and a width being the distance between the left edge of the section with a possible left link (e.g., the reference section) and the right edge of the section with a possible right link (e.g., the selected section). If any part of any other section, or sections, is found in this imaginary rectangle, then the other section(s) are said to be in between the selected section and the reference section.

The process determines as to whether any other section(s) are found to be in between the selected section and the reference section (decision 1040). If other section(s) are in between the selected section and the reference section, then decision 1040 branches to the 'yes' branch bypassing step 1045 as the selected section and the reference section are not valid link candidates. On the other hand, if no other sections lie in between the selected section and the reference section, then decision 1040 branches to the 'no' branch whereupon the appropriate links are established between the selected section and the reference section. For example, if an uplink was found to exist from the selected section to the reference section, than an uplink is established for the selected section linking to the reference section and a downlink is established for the reference section linking back to the selected section.

The process determines as to whether there more link types to check between the selected section and this reference section (decision 1050). If there are more link types to check, then decision 1050 branches to the 'yes' branch which loops back to step 1020 to select the next link type. This looping continues until there are no more link types to check between the selected section and the reference section, at which point decision 1050 branches to the 'no' branch.

The process next determines as to whether there more reference sections to select and process for possible links with the selected section (decision 1055). If there are more reference sections to process, then decision 1055 branches to the 'yes' branch whereupon processing loops back to step 1015 to select and process the next reference section. This looping continues until there are no more reference sections to process (all of the other sections have been checked for links with the selected section), at which point decision 1055 branches to the 'no' branch.

The process then determines as to whether there are any more sections to select and process (decision 1060). If there are more sections to select and process, then decision 1060 branches to the 'yes' branch which loops back to step 1005 to select the next section from section data 400 and the newly selected section is checked for possible vertical and horizontal links as described above. This looping continues until all of the sections included in section data 400 have been processed, at which point decision 1060 branches to the 'no' branch and processing returns to the calling routine (see FIG. 8) at 1095.

FIG. 11 is an exemplary flowchart depicting steps that perform special rules on some sections found in the unstructured source. At step 1110, the process identifies any "special" cases for merging. Special cases include "island" or "orphan" sections that have no links between themselves and other any other sections. Special cases also include identification of an "initial" section that is typically a very large first letter of a paragraph identified as separate section and needing to be merged with the remaining paragraph text in another section rendered in a normal font size.

The process determines as to whether any "special" cases were identified in step 1110 (decision 1120). If any "special" cases were identified, then decision 1120 branches to the 'yes' branch to process the special cases. At step 1130, the process selects the identified special case and the section with which it is being merged. The "selected" section and the "reference" section are chosen based on the respective coordinates so that the selected section appears before the reference section. In this manner, the section identified with the special case may be either the selected section or the reference section. If the section having the special case is identified as the selected section, then the other section is identified as the reference section. Conversely, if the section having the special case is identified as the reference section, then the other section is identified as the selected section.

At step 1140, the process sets the triggered flag to TRUE to indicate that a special rule was triggered during processing of the special rules. Returning to decision 1120, if no "special" cases were identified at step 1110, then decision 1120 branches to the 'no' branch whereupon, at step 1150, the process sets the triggered flag to FALSE indicating that no rules were triggered during processing of the special rules. FIG. 11 processing thereafter returns to the calling routine (see FIG. 8) at 1195.

Figure 12:
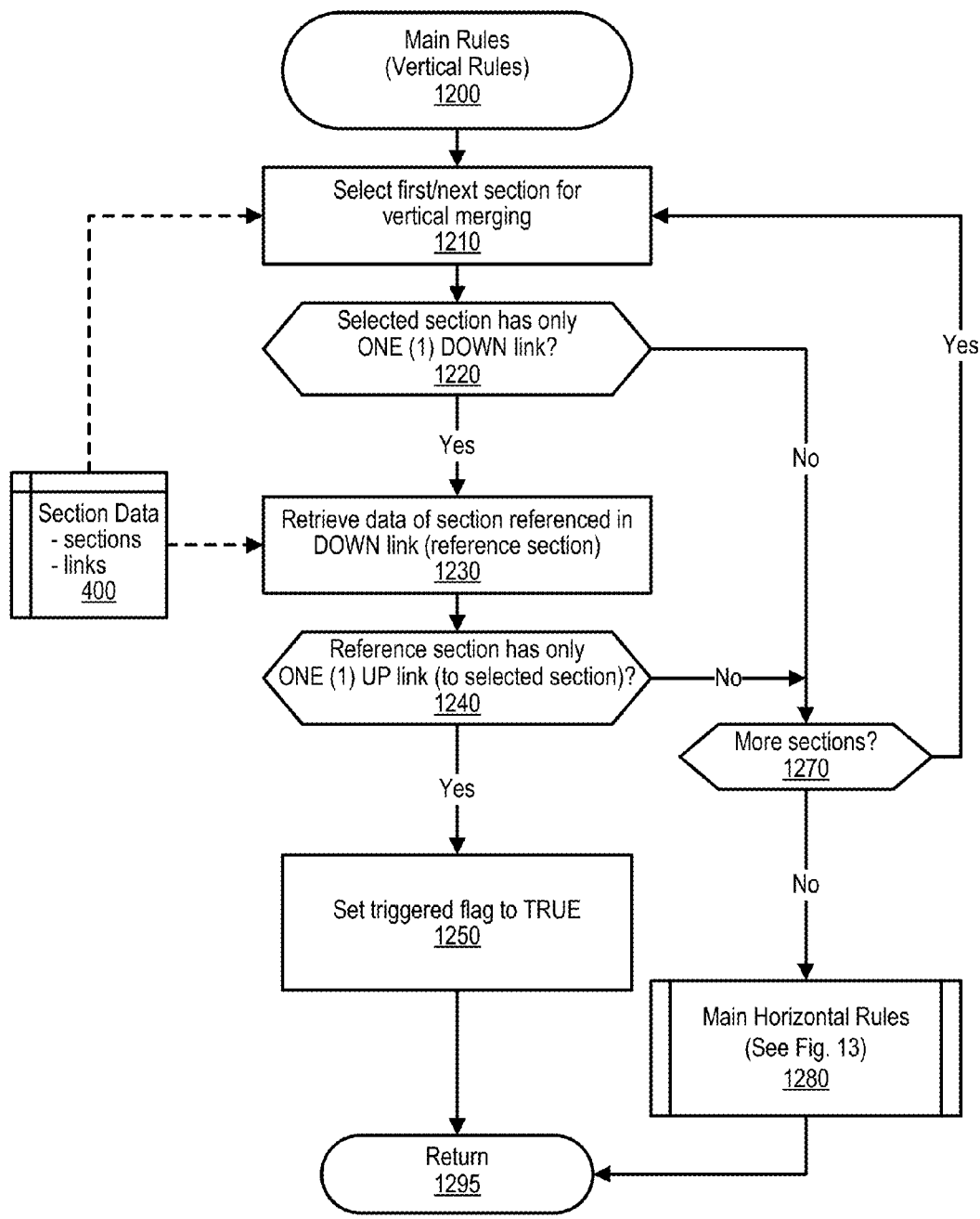
FIG. 12 is an exemplary flowchart depicting steps that perform main rules on sections found in the unstructured source in a top-down fashion.

FIG. 12 is an exemplary flowchart depicting steps that perform main rules on sections found in the unstructured source in a top-down (vertical) fashion. FIG. 12 commences at 1200 and shows the steps taken by a process that performs main vertical rules processing. At step 1210, the process selects the first section for possible vertical merging with the section being selected from section data 400. The process determines as to whether the selected section has only a single (one) downlink (decision 1220). If selected section has only a single (one) downlink, then decision 1220 branches to the 'yes' branch for further processing. On the other hand, if the selected section does not have a solitary downlink (e.g., has no downlinks or has multiple down links), then decision 1220 branches to the 'no' branch bypassing step 1230.

At step 1230, the process retrieves link data from the section referenced in the downlink (the reference section). At decision 1240, the process determines as to whether the reference section has only a single (one) uplink (with the uplink being a link to the selected section). If the reference section has only one uplink link (a link to the selected section), then decision 1240 branches to the 'yes' branch whereupon, at step 1250, the triggered flag is set to TRUE indicating that a merge was identified while processing the main rules and the identified selected section will be merged with the identified reference section and processing returns to the calling routine (see FIG. 8) at 1295. On the other hand, if the reference section has more than one uplink, then decision 1240 branches to the 'no' branch bypassing step 1250.

The process determines as to whether there are more sections to check for possible vertical merging (decision 1270). If there are more sections to check, then decision 1270 branches to the 'yes' branch which loops back to step 1210 to select and process the next section for possible vertical merging. This looping continues until there are no more sections to check, at which point decision 1270 branches to the 'no' branch. At predefined process 1280, the process performs the Main Horizontal Rules routine (see FIG. 13 and corresponding text for processing details). The Main Horizontal Rules routine will set the triggered flag to TRUE if sections are identified for horizontal merging or FALSE if no sections are identified for horizontal merging. FIG. 12 processing thereafter returns to the calling routine (see FIG. 8) at 1295.

Figure 13:
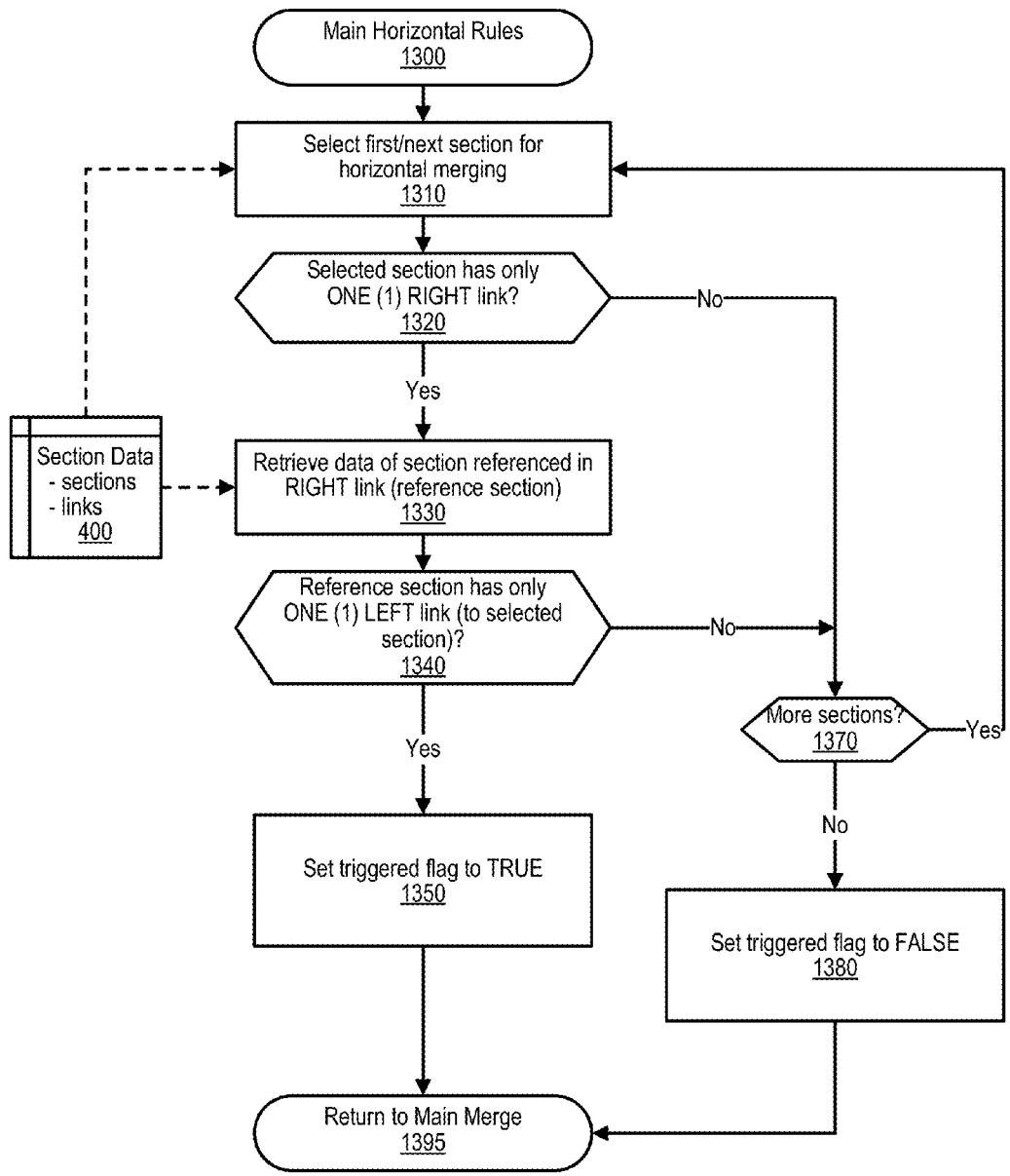
FIG. 13 is an exemplary flowchart depicting steps that perform main rules on sections found in the unstructured source in a left-right fashion.

FIG. 13 is an exemplary flowchart depicting steps that perform main rules on sections found in the unstructured source in a left-right (horizontal) fashion. FIG. 13 commences at 1300 and shows the steps taken by a process that performs main horizontal rules processing. At step 1310, the process selects the first section for possible horizontal merging with the section being selected from section data 400. The process determines as to whether the selected section has only a single (one) right link (decision 1320). If selected section has only a single (one) right link, then decision 1320 branches to the 'yes' branch for further processing. On the other hand, if the selected section does not have a solitary right link (e.g., has no right links or has multiple down links), then decision 1320 branches to the 'no' branch bypassing step 1330.

At step 1330, the process retrieves link data from the section referenced in the right link (the reference section). At decision 1340, the process determines as to whether the reference section has only a single (one) left link (with the left link being a link to the selected section). If the reference section has only one left link (a link to the selected section), then decision 1340 branches to the 'yes' branch whereupon, at step 1350, the triggered flag is set to TRUE indicating that a merge was identified while processing the main rules and the identified selected section will be merged with the identified reference section and processing returns to the calling routine (see FIG. 12) at 1395. On the other hand, if the reference section has more than one left link, then decision 1340 branches to the 'no' branch bypassing step 1350.

The process determines as to whether there are more sections to check for possible horizontal merging (decision 1370). If there are more sections to check, then decision 1370 branches to the 'yes' branch which loops back to step 1310 to select and process the next section for possible horizontal merging. This looping continues until there are no more sections to check, at which point decision 1370 branches to the 'no' branch, whereupon, at step 1380, the triggered flag is set to FALSE indicating that no merges were identified while processing the main rules. FIG. 13 processing thereafter returns to the calling routine (see FIG. 12) at 1395.

Figure 14:
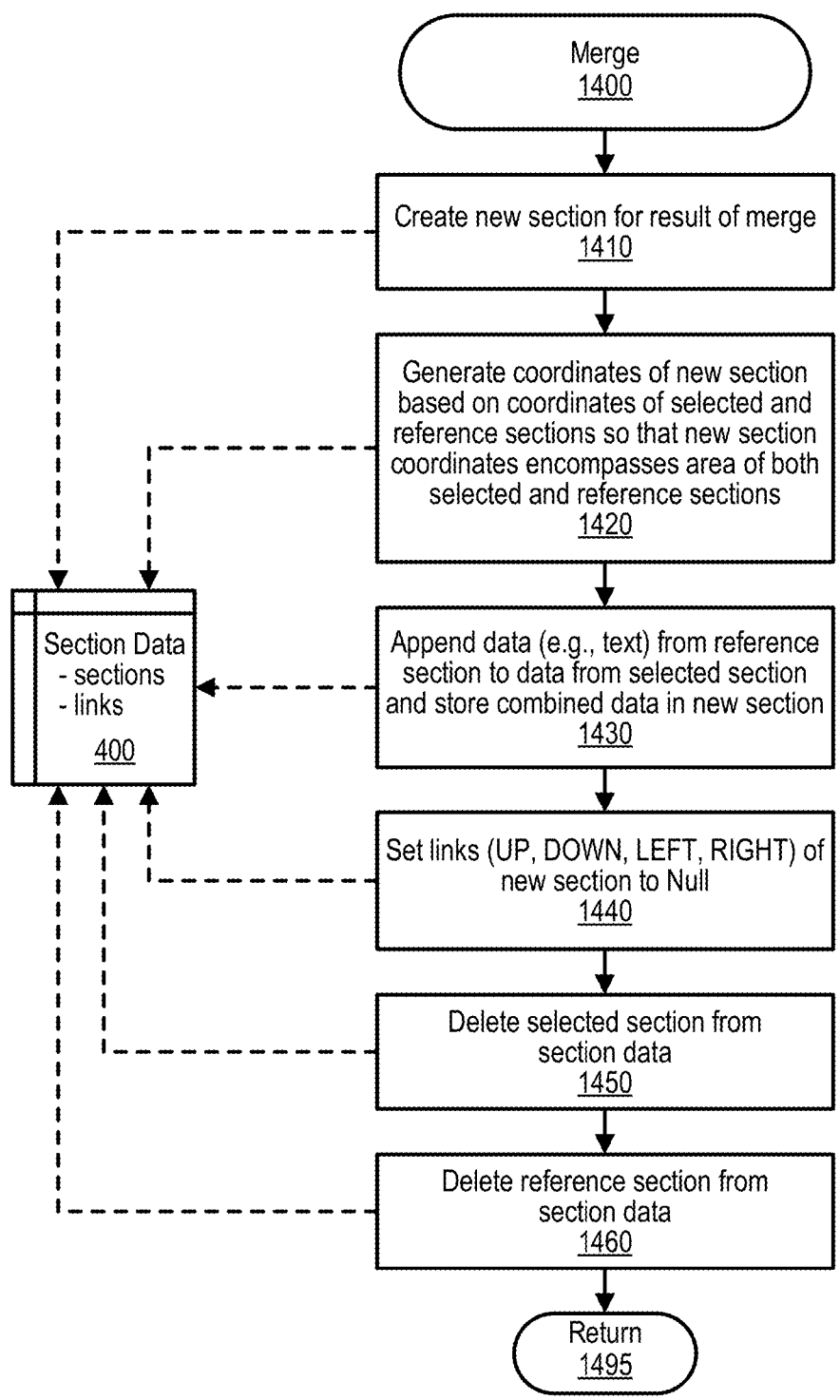
FIG. 14 is an exemplary flowchart depicting steps that merge sections identified as being appropriate for merging from either the special rules, or from one of the sets of main rules.

FIG. 14 is an exemplary flowchart depicting steps that merge sections identified as being appropriate for merging from either the special rules, or from one of the sets of main rules. FIG. 14 commences at 1400 and shows the steps taken by a process that performs the merge routine. At step 1410, the process creates a new section in memory area 400 with the new section being used to store the result of the merge of the selected section and the reference section. At step 1420, the process generates coordinates of the new section based on coordinates of selected and reference sections so that new section coordinates encompasses the area of both the selected section and the reference section. The coordinates of the new section are stored in section data 400.

At step 1430, the process appends the data (e.g., text) from the reference section to the data in the selected section and stores the combined data in the new section in memory area 400. In addition, step 1430 also appends the metadata (e.g., fonts, font sizes, font colors, etc.) from the reference section to the metadata in the selected section and stores the combined metadata in memory area 400.

At step 1440, the process initializes the links (uplink, downlink, left link and right link) associated with the new section to Null indicating that such links have not yet been established. At step 1450, the process deletes the selected section from section data 400. At step 1460, the process also deletes the reference section from section data 400. FIG. 14 processing thereafter returns to the calling routine (see FIG. 8) at 1495.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
   one or more processors;
   a memory coupled to at least one of the processors; and
   a set of computer program instructions stored in the memory and executed by at least one of the processors in order to perform actions of:
      identifying a plurality of sections from a sequence of characters included in a Portable Document Format (PDF) source file, wherein each section includes a unique set of coordinate positions;
      building a plurality of directional links between the plurality of sections based on a relative position of each sections' coordinate positions in relation to other sections' coordinate positions along an axis; and
      repeatedly merging two or more sections to form increasingly larger sections, wherein the merged two or more sections are selected based on the directional links built between the two or more sections, wherein the repeatedly merging further comprises building one or more new directional links between the increasingly larger sections and one or more remaining sections selected from the plurality of sections, and wherein the repeatedly merging continues until the plurality of sections are exhausted and consolidated into a final larger section, wherein the final larger section is arranged in an intended reading order.

2. The information handling system of claim 1 wherein the building of the directional links further comprises:
   selecting one of the sections from the plurality of sections;
   building zero or more directional links between the selected section and the other sections included in the plurality of sections by:
   establishing zero or more vertical links between the selected section from the plurality of sections and a reference section selected from the plurality of sections wherein the selected section has at least one common horizontal coordinate position with the selected reference section and wherein a vertical rectangle space formed by a horizontal boundary of the selected section and a corresponding horizontal boundary the selected reference section is void of any intervening sections from the plurality of sections; and
   establishing zero or more horizontal links between the selected section and the selected reference section wherein the selected section has at least one common vertical coordinate position with the selected reference section and wherein a horizontal rectangle space formed by a vertical boundary of the selected section and a corresponding vertical boundary the selected reference section is void of any intervening sections from the plurality of sections; and repeatedly selecting a next one of the sections from the plurality of sections and building the zero or more directional links until each of the sections from the plurality of sections has been selected.

3. The information handling system of claim 2 wherein the actions further comprise:
   specially merging two or more of the plurality of sections by:

identifying a first section at a first set of coordinate positions, wherein the first set of coordinate positions forms a first rectangular boundary around the first section, and wherein the identification of the first section is based on at least one special rule;

identifying a second section based on at a second set of coordinate positions, wherein the second set of coordinate positions forms a second rectangular boundary around the second section, and wherein the identification of the second section is based on a proximity to the first section;

merging the first and second sections to form one of the increasingly larger sections; and repeating the building of the zero or more directional links between the increasingly larger section formed by the merger of the first and second sections with the other sections included in the plurality of sections.

4. The information handling system of claim 3 wherein identification of the first section based on one of the special rules further comprises:

identifying that the first section is an island section that is void of any directional links to other sections from the plurality of sections.

5. The information handling system of claim 3 wherein identification of the first section based on one of the special rules further comprises:

identifying that the first section is an initial character rendered in a first font size that is larger than a second font size used to render a plurality of characters included in the second section.

6. The information handling system of claim 2 wherein the actions further comprise:

vertically merging two or more of the plurality of sections by:

identifying one of the plurality of sections as a selected section and one of the plurality of sections as a reference section, wherein the identification is based on the selected section including a first directional link to the reference section in a first vertical direction and the reference section including a second directional link to the selected section in an second vertical direction, wherein the second vertical direction is opposite from the first vertical direction; and merging the selected section and the reference section to form one of the increasingly larger sections; and repeating the building of the zero or more directional links between the increasingly larger section formed by the merger of the selected section and the reference section with the other sections included in the plurality of sections.

7. The information handling system of claim 6 wherein the actions further comprise:

repeatedly performing the vertical merger of sections until exhaustion of selected and reference sections with vertical links is encountered;

upon exhaustion of selected and reference sections with vertical links, horizontally merging two or more of the plurality of sections by:

identifying one of the plurality of sections as a second selected section and one of the plurality of sections as a second reference section, wherein the identification is based on the second selected section including a primary directional link to the reference section in a first horizontal direction and the second reference section including a secondary directional link to the second selected section in an second horizontal direction, wherein the second horizontal direction is opposite from the first horizontal direction; and merging the second selected section and the second reference section to form one of the increasingly larger sections; and repeating the building of the zero or more directional links between the increasingly larger section formed by the merger of the second selected section and the second reference section with the other sections included in the plurality of sections.

8. The information handling system of claim 7 wherein the actions further comprise:

repeatedly performing the special merging, the vertical merging, and the horizontal merging until the increasingly larger section includes all of the plurality of sections consolidated into the final large section;

inputting the final large section to a corpus utilized by a question answering (QA) system; and increasing a natural language processing (NLP) performance of the QA system by performing NLP operations on the final large section instead of the PDF source file.

9. A computer program product stored in a computer readable storage medium, comprising computer program code that, when executed by an information handling system, causes the information handling system to perform actions comprising:

identifying a plurality of sections from a sequence of characters included in a Portable Document Format (PDF) source file, wherein each section includes a unique set of coordinate positions;

building a plurality of directional links between the plurality of sections based on a relative position of each sections' coordinate positions in relation to other sections' coordinate positions along an axis; and repeatedly merging two or more sections to form increasingly larger sections, wherein the merged two or more sections are selected based on the directional links built between the two or more sections, wherein the repeatedly merging further comprises building one or more new directional links between the increasingly larger sections and one or more remaining sections selected from the plurality of sections, and wherein the repeatedly merging continues until the plurality of sections are exhausted and consolidated into a final larger section, wherein the final larger section is arranged in an intended reading order.

10. The computer program product of claim 9 wherein the building of the directional links further comprises:

selecting one of the sections from the plurality of sections;

building zero or more directional links between the selected section and the other sections included in the plurality of sections by:

establishing zero or more vertical links between the selected section from the plurality of sections and a reference section selected from the plurality of sections wherein the selected section has at least one common horizontal coordinate position with the selected reference section and wherein a vertical rectangle space formed by a horizontal boundary of the selected section and a corresponding horizontal boundary the selected reference section is void of any intervening sections from the plurality of sections; and establishing zero or more horizontal links between the selected section and the selected reference section wherein the selected section has at least one common vertical coordinate position with the selected reference section and wherein a horizontal rectangle space formed by a vertical boundary of the selected section and a corresponding vertical boundary the selected reference section is void of any intervening sections from the plurality of sections; and repeatedly selecting a next one of the sections from the plurality of sections and building the zero or more directional links until each of the sections from the plurality of sections has been selected.

11. The computer program product of claim 10 wherein the actions further comprise:

specially merging two or more of the plurality of sections by:
identifying a first section at a first set of coordinate positions, wherein the first set of coordinate positions forms a first rectangular boundary around the first section, and wherein the identification of the first section is based on at least one special rule;
identifying a second section based on at a second set of coordinate positions, wherein the second set of coordinate positions forms a second rectangular boundary around the second section, and wherein the identification of the second section is based on a proximity to the first section;
merging the first and second sections to form one of the increasingly larger sections; and
repeating the building of the zero or more directional links between the increasingly larger section formed by the merger of the first and second sections with the other sections included in the plurality of sections.

12. The computer program product of claim 11 wherein identification of the first section based on one of the special rules further comprises:
identifying that the first section is an island section that is void of any directional links to other sections from the plurality of sections.

13. The computer program product of claim 11 wherein identification of the first section based on one of the special rules further comprises:
identifying that the first section is an initial character rendered in a first font size that is larger than a second font size used to render a plurality of characters included in the second section.

14. The computer program product of claim 10 wherein the actions further comprise:
vertically merging two or more of the plurality of sections by:
identifying one of the plurality of sections as a selected section and one of the plurality of sections as a reference section, wherein the identification is based on the selected section including a first directional link to the reference section in a first vertical direction and the reference section including a second directional link to the selected section in an second vertical direction, wherein the second vertical direction is opposite from the first vertical direction; and
merging the selected section and the reference section to form one of the increasingly larger sections; and
repeating the building of the zero or more directional links between the increasingly larger section formed by the merger of the selected section and the reference section with the other sections included in the plurality of sections.

15. The computer program product of claim 14 wherein the actions further comprise:
repeatedly performing the vertical merger of sections until exhaustion of selected and reference sections with vertical links is encountered;
upon exhaustion of selected and reference sections with vertical links, horizontally merging two or more of the plurality of sections by:
identifying one of the plurality of sections as a second selected section and one of the plurality of sections as a second reference section, wherein the identification is based on the second selected section including a primary directional link to the reference section in a first horizontal direction and the second reference section including a secondary directional link to the second selected section in an second horizontal direction, wherein the second horizontal direction is opposite from the first horizontal direction; and
merging the second selected section and the second reference section to form one of the increasingly larger sections; and
repeating the building of the zero or more directional links between the increasingly larger section formed by the merger of the second selected section and the second reference section with the other sections included in the plurality of sections.

16. The computer program product of claim 15 wherein the actions further comprise:
repeatedly performing the special merging, the vertical merging, and the horizontal merging until the increasingly larger section includes all of the plurality of sections consolidated into the final large section;
inputting the final large section to a corpus utilized by a question answering (QA) system; and
increasing a natural language processing (NLP) performance of the QA system by performing NLP operations on the final large section instead of the PDF source file.

* * * * *